(12) United States Patent
New

(10) Patent No.: US 8,070,362 B2
(45) Date of Patent: Dec. 6, 2011

(54) SLIDING RADIAL BEARING

(75) Inventor: Nigel Henry New, Middlesex (GB)

(73) Assignee: Delaware Capital Formation, Inc., Wilmington, DE (US)

( * ) Notice: Subject to any disclaimer, the term of this patent is extended or adjusted under 35 U.S.C. 154(b) by 600 days.

(21) Appl. No.: 12/290,327

(22) Filed: Oct. 29, 2008

(65) Prior Publication Data

US 2009/0116769 A1    May 7, 2009

(30) Foreign Application Priority Data

Nov. 3, 2007  (EP) ..................... 07254359

(51) Int. Cl.
*F16C 32/06*   (2006.01)
(52) U.S. Cl. ........................ 384/114; 384/397
(58) Field of Classification Search ................. 384/100, 384/107, 114, 397–399
See application file for complete search history.

(56) References Cited

U.S. PATENT DOCUMENTS

| 5,575,355 A | * | 11/1996 | Williams et al. | ............ 384/100 |
| 5,822,846 A | | 10/1998 | Moritan et al. | |
| 6,361,214 B1 | * | 3/2002 | Ichiyama | ...................... 384/107 |

FOREIGN PATENT DOCUMENTS

| GB | 2278160 | 11/1994 |
| GB | 2409008 | 6/2005 |

* cited by examiner

*Primary Examiner* — Thomas R Hannon
(74) *Attorney, Agent, or Firm* — Ryan Kromholz & Manion, S.C.

(57) ABSTRACT

A sliding radial bearing assembly for use on a rotating shaft in machinery where a fluid lubricant passes through the assembly to provide a lubricant film between stationary and rotating parts of the assembly. Any gaseous phase is allowed readily to escape from the assembly by providing a lubricant passage which exits close to the shaft, while a substantially non-gaseous film of liquid lubricant is maintained at the bearing interface.

10 Claims, 1 Drawing Sheet

SLIDING RADIAL BEARING

RELATED APPLICATIONS

This application claims the benefit of European Patent Appln. No. 07254359.8, filed on 3 Nov. 2007.

BACKGROUND OF THE INVENTION

This invention relates to radial bearing assemblies for supporting rotating shafts and in particular relates to sliding bearing arrangements lubricated hydrodynamically.

More specifically, the invention relates to a bearing for use in machinery where the lubricant contains both liquid and gaseous phases in the lubricant feed. In such bearings used in pumps, for example, under certain operating conditions the lubricant, which is a mixture of fluids, may, as a result of pressure or temperature change, become partially separated where some of the lubricant may change from liquid to gas either before it reaches the bearing chamber or within the chamber.

Such bearings are likely to become damaged if a proportion of the liquid lubricant is replaced with a gaseous phase at the bearing interface, since the lubricant will have insufficient viscosity to maintain a hydrodynamic film between the stationary and moving parts of the bearing.

In the case of a journal bearing the separated liquid phase will be centrifuged by the rotation of the shaft to take up any available space at a radial distance from the shaft while the gaseous phase will remain close to the shaft. Thus, the working surfaces may be enveloped in gas. This is made worse in the case of tilting pad journal bearings where there is a significant volume radially outwards from the shaft, between and outwards of the pads.

It is an object of the present invention to mitigate this problem by allowing the shaft to separate the phases by centrifugal action whilst also allowing the gaseous phase to pass readily through the bearing assembly while the liquid phase continues to provide a lubricant film between the stationary and moving parts of the bearing.

SUMMARY OF THE INVENTION

According to the present invention there is provided a sliding radial bearing assembly to be placed about a rotating shaft in machinery where a fluid lubricant is applied to form a lubricating film between stationary and rotating parts, the assembly comprising a rotational part and a non-rotational part disposed radially outwards of the rotational part to be in sliding engagement thereon to provide a bearing interface therebetween, a casing to enclose the parts, and a lubricant passage through the casing to enable lubricant to flow through the assembly; characterized in that the lubricant passage has an outlet from the casing disposed radially inwards of the bearing interface between the first and second parts.

In an assembly mounted on a rotatable shaft, the rotational part may be a locally enlarged diameter portion of the rotatable shaft.

The rotational part may be a separate annular sleeve to be mounted radially and concentrically on a rotatable shaft for rotation therewith.

The rotational part may include at least one further passage extending axially therethrough and located radially inwards of the bearing interface between the rotational and non-rotational parts.

The non-rotational part may be an annular bearing pad having a radially innermost bearing surface in sliding contact with the bearing surface of the rotational part.

The non-rotational part may be an array of discrete bearing pads spaced apart circumferentially around the bearing surface of the rotational part and in sliding contact therewith.

The lubricant passage may be formed as at least one inlet aperture and at least one outlet aperture in the casing communicating with a chamber therein containing the rotational and non-rotational parts.

Each further passage may be formed as an array of circumferentially spaced ducts extending axially through the rotational part.

Each further passage may be formed as an axial groove along the radially innermost surface of the separate annular sleeve.

In an assembly mounted on a rotatable shaft each further passage may be formed as an axial groove along the outermost surface of the shaft within the separate annular sleeve.

Embodiments of the invention will now be described, by way of example only, with reference to the accompanying drawings.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
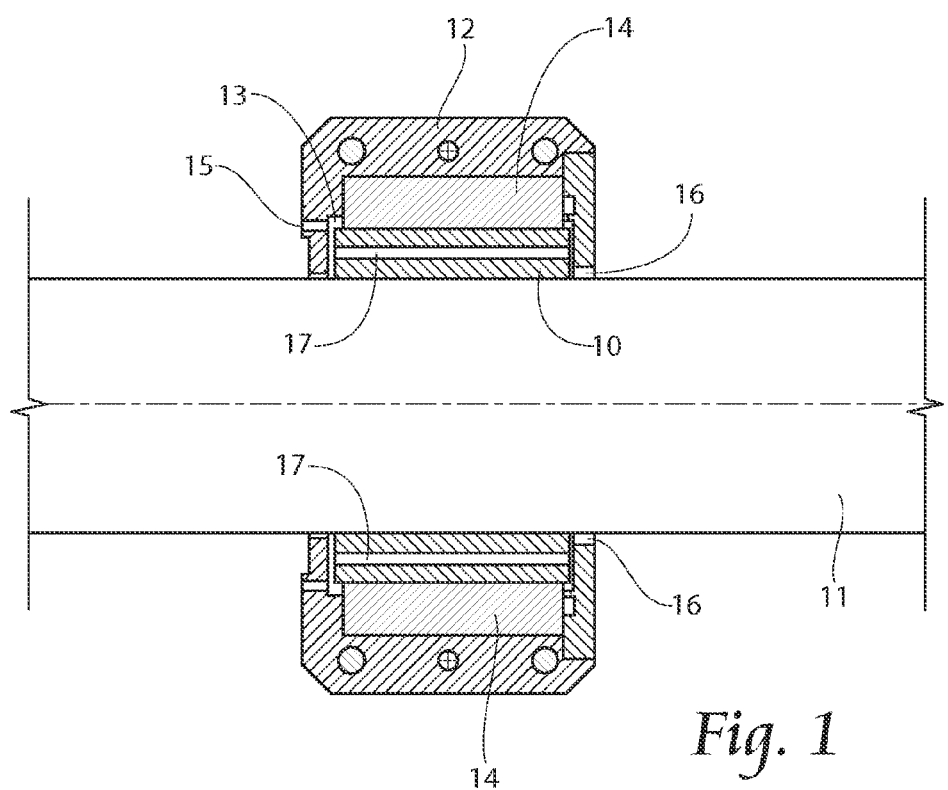
FIG. 1 illustrates, partly in cross-section, a sliding radial bearing assembly made in accordance with the invention, mounted on a rotatable shaft.

Referring now to FIG. 1, in this embodiment the bearing assembly comprises a rotational part in the form of an annular sleeve 10 fixedly mounted on the surface of a shaft 11 for rotation therewith. A casing 12 defines an internal bearing chamber 13 containing the sleeve 10 and a non-rotational part in the form of an annular bearing pad 14 whose radially internal surface is in sliding contact with the outer bearing surface of the sleeve 10. An oil inlet 15 and outlet 16 provide a passage through the chamber 13 for a liquid lubricant which flows, preferably with the aid of a pump, through the chamber during rotation of the shaft 11. The outlet 16 is disposed radially inwards of the bearing interface between the sleeve 10 and the pad 14.

The bearing pad 14 may, instead, comprise a circumferential array of spaced discrete pads retained by the casing 12 and each in sliding engagement with the sleeve 10.

Where under certain operating conditions the lubricant at least partially separates into liquid and gaseous phases, it is important to ensure that the gaseous phase passes through the bearing assembly without interfering with the integrity of the lubricant film at the sliding interface. Thus, while the liquid phase is forced radially outwards by centrifugal action, the gaseous phase is permitted to pass readily through the bearing assembly to the outlet 16 where it exits close to the shaft 11, thus avoiding the risk of gaseous content reducing the efficiency of the lubricant at the bearing interface.

To enhance the rapid passage of the gaseous phase, a plurality of circumferentially spaced ducts 17 extend axially through the sleeve 10 close to the shaft, i.e., between the radially innermost surface of the sleeve 10 and the bearing interface between the sleeve 10 and the pad or pads 14.

In the drawing the ducts 17 are illustrated as being situated midway between the inner and outer surfaces of the sleeve 10 but ideally they should be kept as close as possible to the innermost surface and can in fact be represented as axial grooves in the innermost surface of the sleeve 10 or even as axial grooves along the outermost surface of the shaft itself.

In operation, some of the liquid phase will bypass the bearing through the ducts 17 along with the gaseous phase, but by restricting the cross-sectional area of the ducts 17 the volume of liquid passed therethrough will be minimal compared with the volume of gas passing through the ducts, since the considerably higher viscosity of the liquid phase will cause it to be centrifuged outwards away from the ducts 17.

The ratio of the gas to liquid phases will be determined by various factors including the rate of rise of temperature from start up and so the size and location of the ducts 17 can be designed according to the operational parameters of the assembly, and these in turn may be determined by the materials used for the bearing parts. The materials may be metallic or in some cases ceramic or polymeric, depending on the operational environment of the machinery concerned and by the expected operating temperature within the bearing.

Figure 2:
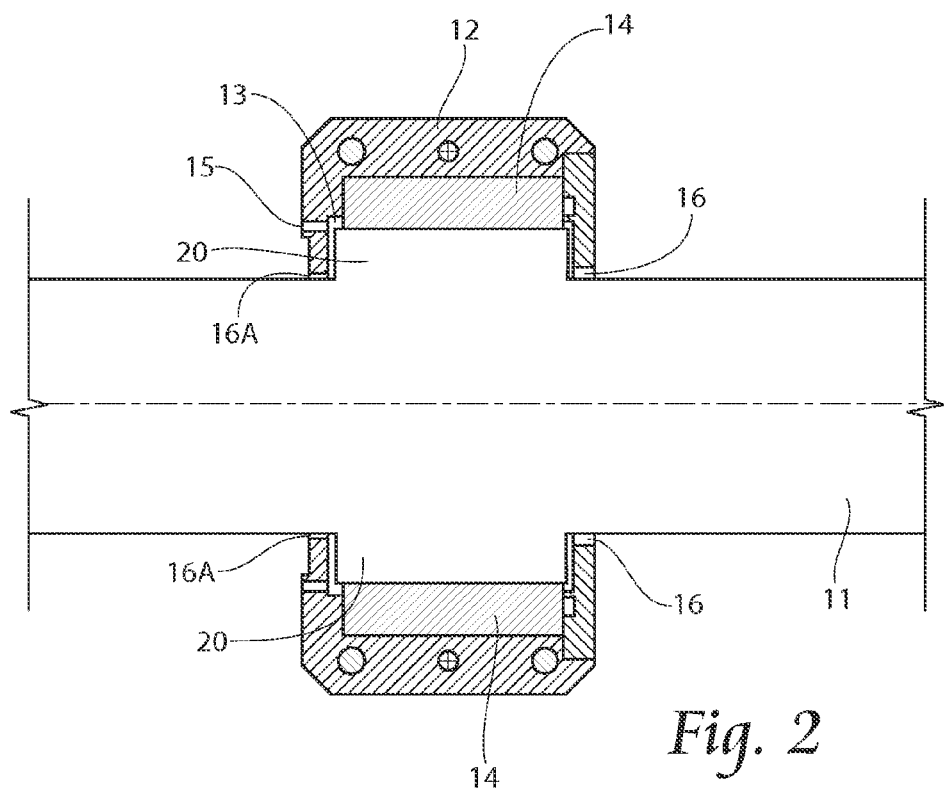
FIG. 2 illustrates a further embodiment.

In a further embodiments, as illustrated in FIG. 2, the shaft 11 may be locally enlarged in diameter as shown at 20 so that the bearing interface is disposed radially outwards of the outlet aperture 16, and so for this purpose the casing 12 extends inwards to a position closely adjacent the normal (non-enlarged) diameter of the shaft 11. The outlet 16 provides an annular gap between the casing and the lesser diameter of the shaft. Here, again, if desired the enlarged diameter portion 20 may include axial ducts similar to ducts 17 in FIG. 1. If no axial ducts are provided then the gas will exit through a gap 16A whilst the lubricant that has passed through the bearing will exit through gap 16. In this arrangement gap 16 may be of a radially larger diameter then gap 16A. The arrangement of FIG. 2 may be more convenient and less costly in an application where the bearing assembly and shaft are fabricated as part of the same manufacturing process, whereas the arrangement illustrated in FIG. 1 may be more convenient where the bearing assembly is manufactured separately and subsequently applied to an existing shaft.

It is not intended to limit the invention to the specific details illustrated and described, but rather that the principle should be upheld of permitting, in separated lubricant phases, the gaseous phase to pass readily through and outlet the bearing assembly axially, at a position inwards of the bearing interface where the liquid phase will be maintained by centrifugal action.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A sliding radial bearing assembly to be placed about a rotating shaft in machinery where a fluid lubricant is applied to form a lubricating film between stationary and rotating parts, the assembly comprising:
   a rotational part and a non-rotational part disposed radially outwards of the rotational part to be in sliding engagement thereon to provide a bearing interface therebetween;
   a casing to enclose the parts; and
   a lubricant passage through the casing to enable lubricant to flow through the assembly; characterized in that the lubricant passage has an outlet from the casing disposed radially inwards of the bearing interface between the first and second parts.

2. A sliding radial bearing assembly according to claim 1, in an assembly mounted on a rotatable shaft, wherein the rotational part is a locally enlarged diameter portion of the rotatable shaft.

3. A sliding radial bearing assembly according to claim 1 wherein the rotational part is a separate annular sleeve to be mounted radially and concentrically on a rotatable shaft for rotation therewith.

4. A sliding radial bearing assembly according to claim 1 including at least one further passage extending axially through the rotational part and located radially inwards of the bearing interface between the rotational and on-rotational parts.

5. A sliding radial bearing assembly according to claim 4 wherein each further passage is formed as an array of circumferentially spaced ducts extending axially through the rotational part.

6. A sliding radial bearing assembly according to claim 1 wherein the non-rotational part is an annular bearing pad having a radially innermost bearing surface in sliding contact with the bearing surface of the rotational part.

7. A sliding radial bearing assembly according to claim 1 wherein the non-rotational part is an array of discrete bearing pads spaced apart circumferentially around the bearing surface of the rotational part and in sliding contact therewith.

8. A sliding radial bearing assembly according to claim 1 wherein the lubricant passage is formed as at least one inlet aperture and at least one outlet aperture in the casing communicating with a chamber therein containing the rotational and non-rotational parts.

9. A sliding radial bearing assembly according to claim 1 wherein the rotational part is a separate annular sleeve mounted radially and concentrically on a rotatable shaft for rotation therewith and includes at least one further passage located radially inwards of the bearing interface between the rotational and non-rotational parts, the or each said further passage being formed as an axial groove along the radially innermost surface of the separate annular sleeve.

10. A sliding radial bearing assembly according to claim 1 when mounted on a shaft, the rotational part being a separate annular sleeve to be mounted radially and concentrically on a rotatable shaft for rotation therewith and including at least one further passage extending axially and located radially inwards of the bearing interface between the rotational and non-rotation parts, the or each said further passage being formed as an axial groove along the outermost surface of the shaft within the assembly.

* * * * *